(12) United States Patent
Lee et al.

(10) Patent No.: US 9,263,779 B2
(45) Date of Patent: Feb. 16, 2016

(54) LITHIUM AIR BATTERY MODULE

(71) Applicant: Samsung Electronics Co., Ltd., Suwon-si, Gyeonggi-do (KR)

(72) Inventors: Dong-joon Lee, Yongin-si (KR); Dong-min Im, Seoul (KR); Young-gyoon Ryu, Suwon-si (KR); Victor Roev, Suwon-si (KR); Sang-bok Ma, Suwon-si (KR); Min-sik Park, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 396 days.

(21) Appl. No.: 13/854,511

(22) Filed: Apr. 1, 2013

(65) Prior Publication Data
US 2013/0330639 A1 Dec. 12, 2013

(30) Foreign Application Priority Data
Apr. 3, 2012 (KR) .......................... 10-2012-0034583

(51) Int. Cl.
*H01M 12/08* (2006.01)
(52) U.S. Cl.
CPC .................................... *H01M 12/08* (2013.01)

(58) Field of Classification Search
CPC ......................................................... H01M 12/08
USPC ............................................................ 429/403
See application file for complete search history.

(56) References Cited

U.S. PATENT DOCUMENTS

| 4,157,943 | A | 6/1979 | Scarpellino, Jr. et al. | |
|---|---|---|---|---|
| 2011/0091777 | A1 | 4/2011 | Mizuno et al. | |
| 2012/0021303 | A1* | 1/2012 | Amendola et al. | 429/406 |
| 2012/0115068 | A1* | 5/2012 | Nakanishi | 429/498 |
| 2013/0078535 | A1* | 3/2013 | Aizawa | 429/403 |
| 2013/0108934 | A1* | 5/2013 | Lee et al. | 429/405 |
| 2013/0224609 | A1* | 8/2013 | Lee et al. | 429/403 |

FOREIGN PATENT DOCUMENTS

| JP | 2003217642 | A | 7/2003 |
|---|---|---|---|
| JP | 2005267973 | A | 9/2005 |
| JP | 2008091102 | A | 4/2008 |
| JP | 2011222412 | A | 11/2011 |
| KR | 100886589 | B1 | 3/2009 |
| KR | 1020090034354 | A | 4/2009 |
| KR | 101083961 | B1 | 11/2011 |
| WO | WO 2010128552 | A1 * | 11/2010 |
| WO | WO 2011152464 | A1 * | 12/2011 |

* cited by examiner

*Primary Examiner* — Stewart Fraser
(74) *Attorney, Agent, or Firm* — Cantor Colburn LLP

(57) ABSTRACT

A lithium air battery module including a lithium air battery cell including a first electrolyte; an additional electrolyte disposed non-adjacent the first electrolyte; and a housing which accommodates the lithium air battery cell and the additional electrolyte.

20 Claims, 6 Drawing Sheets

LITHIUM AIR BATTERY MODULE

CROSS-REFERENCE TO RELATED APPLICATIONS

This application claims priority to and the benefit of Korean Patent Application No. 10-2012-0034583, filed on Apr. 3, 2012, and all the benefits accruing therefrom under 35 U.S.C. §119, the content of which is incorporated herein in its entirety by reference.

BACKGROUND

1. Field

The present disclosure relates to a lithium air battery module.

2. Description of the Related Art

Lithium air batteries include a negative electrode capable of reversibly discharging lithium ions, a positive electrode that includes an oxidation-reduction catalyst and use oxygen in air as a positive electrode active material, and a lithium ion conductive medium disposed between the positive electrode and the negative electrode.

A specific energy of a lithium air battery is greater than 3000 watt hours per kilogram (Wh/kg), which corresponds to a specific energy about 10 times higher than that of a lithium ion battery. In addition, a lithium air battery is eco-friendly and may provide improved stability compared to a lithium ion battery, and thus development of a lithium air battery is being actively conducted.

Lithium metal has high capacity, and thus is a desirable negative electrode active material for a lithium air battery.

However, since a lithium air battery uses an oxygen-containing gas, e.g., air, as the positive electrode active material, a positive electrode of the lithium air battery is open to the environment. Because the lithium air battery in open to the environment, an electrolyte contacting the positive electrode can evaporate, reducing a lifespan of the lithium air battery due to evaporation of the electrolyte. Thus there remains a need for a lithium air battery having improved lifespan.

SUMMARY

Provided is a lithium air battery module capable of preventing exhaustion of an electrolyte of the lithium air battery.

Additional aspects will be set forth in part in the description which follows and, in part, will be apparent from the description.

According to an aspect, a lithium air battery module includes a lithium air battery cell including a first electrolyte; an additional electrolyte disposed non-adjacent the first electrolyte; and a housing, which accommodates the lithium air battery cell and the additional electrolyte.

The housing may further include: an outlet for discharging air inside the housing; and a collector for collecting the additional electrolyte from the air.

The collector may be disposed in the outlet.

The collector may cool the air to collect the additional electrolyte from the air.

The lithium air battery module may further include an accommodating unit for accommodating the additional electrolyte.

The lithium air battery module may further include a flow path disposed between the collector and the accommodating unit for moving the additional electrolyte to the accommodating unit.

The collector may be disposed in an upper part of the housing, and the accommodating unit may be disposed in a lower part of the housing.

The lithium air battery cell may include a positive electrode, a negative electrode, and the first electrolyte interposed between the positive electrode and the negative electrode, wherein the first electrolyte and the additional electrolyte may be a same electrolyte.

The first electrolyte may be a non-aqueous liquidelectrolyte.

The first electrolyte may include at least one selected from an aprotic solvent and water.

The lithium air battery module may further include a passivation layer interposed between the second electrolyte and the negative electrode.

The passivation layer may be at least one selected from an inorganic solid electrolyte, a polymer solid electrolyte, a gel polymer electrolyte, and a lithium ion conductive solid electrolyte.

The lithium air battery module may further include a second electrolyte interposed between the negative electrode and the passivation layer.

The second electrolyte may include at least one selected from a non-aqueous liquid electrolyte, an inorganic solid electrolyte, and a polymer solid electrolyte.

The positive electrode may include a porous carbon-based material.

Also disclosed is a method of extending a life of a lithium air battery, the method including: disposing an accommodating unit for an additional electrolyte in a lithium air battery housing, the lithium air battery housing further including a lithium air battery cell including a first electrolyte, to extend the life of the lithium air battery.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
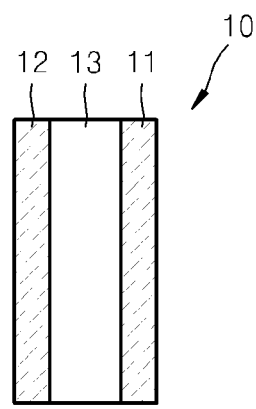
FIG. 1 is a schematic diagram of an embodiment of a lithium air battery cell.

Hereinafter, the present invention will be described in further detail by explaining exemplary embodiments with reference to the attached drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals in the drawings denote like elements throughout. In the drawings, the thicknesses of layers and regions are exaggerated for clarity.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term "air" is often used to refer to atmospheric air. For convenience, the term 'air' as used herein refers to any oxygen containing gas, and thus is not limited to atmospheric air and may include a gas including oxygen or pure oxygen gas. The definition of the term 'air' may be applied to all uses, for example, an air battery, an air positive electrode, and the like.

As used herein, the term "and/or" includes any and all combinations of one or more of the associated listed items. "Or" means "and/or." Expressions such as "at least one of," when preceding a list of elements, modify the entire list of elements and do not modify the individual elements of the list.

"Alkyl" means a straight or branched chain, saturated, monovalent hydrocarbon group (e.g., methyl or hexyl).

"Alkenyl" means a straight or branched chain, monovalent hydrocarbon group having at least one carbon-carbon double bond (e.g., ethenyl (—HC=CH$_2$)).

"Alkynyl" means a straight or branched chain, monovalent hydrocarbon group having at least one carbon-carbon triple bond (e.g., ethynyl).

"Aryl" means a monovalent group formed by the removal of one hydrogen atom from one or more rings of an arene (e.g., phenyl or napthyl).

"Arene" means a hydrocarbon having an aromatic ring, and includes monocyclic and polycyclic hydrocarbons wherein the additional ring(s) of the polycyclic hydrocarbon may be aromatic or nonaromatic. Specific arenes include benzene, naphthalene, toluene, and xylene.

"Alkoxy" means an alkyl group that is linked via an oxygen (i.e., alkyl-O—), for example methoxy, ethoxy, and sec-butyloxy groups.

The prefix "hetero" means that the compound or group includes at least one a heteroatom (e.g., 1, 2, or 3 heteroatom(s)), wherein the heteroatom(s) is each independently N, O, S, Si, or P.

"Substituted" means that the compound or group is substituted with at least one (e.g., 1, 2, 3, or 4) substituent independently selected from a hydroxyl (—OH), a C1-9 alkoxy, a C1-9 haloalkoxy, an oxo (=O), a nitro (—NO$_2$), a cyano (—CN), an amino (—NH$_2$), an azido (—N$_3$), an amidino (—C(=NH)NH$_2$), a hydrazino (—NHNH$_2$), a hydrazono (—C(=NNH$_2$)—), a carbonyl (—C(=O)—), a carbamoyl group (—C(O)NH$_2$), a sulfonyl (—S(=O)$_2$—), a thiol (—SH), a thiocyano (—SCN), a tosyl (CH$_3$C$_6$H$_4$SO$_2$—), a carboxylic acid (—O(=O)OH), a carboxylic C1 to C6 alkyl ester (—O(=O)OR wherein R is a C1 to C6 alkyl group), a carboxylic acid salt (—O(=O)OM) wherein M is an organic or inorganic anion, a sulfonic acid (—SO$_3$H$_2$), a sulfonic mono- or dibasic salt (—SO$_3$MH or —SO$_3$M$_2$ wherein M is an organic or inorganic anion), a phosphoric acid (—PO$_3$H$_2$), a phosphoric acid mono- or dibasic salt (—PO$_3$MH or —PO$_3$M$_2$ wherein M is an organic or inorganic anion), a C1 to C12 alkyl, a C3 to C12 cycloalkyl, a C2 to C12 alkenyl, a C5 to C12 cycloalkenyl, a C2 to C12 alkynyl, a C6 to C12 aryl, a C7 to C13 arylalkylene, a C4 to C12 heterocycloalkyl, and a C3 to C12 heteroaryl instead of hydrogen, provided that the substituted atom's normal valence is not exceeded.

FIG. 1 is a schematic diagram of an embodiment of a lithium air battery cell 10.

Referring to FIG. 1, the lithium air battery cell 10 includes a positive electrode 11 including an oxidation-reduction oxygen catalyst for using oxygen in air as a positive electrode active material, a negative electrode 12 capable of reversibly discharging lithium ions, and a first electrolyte 13 that is a lithium ion conductive medium and is disposed between the positive electrode 11 and the negative electrode 12.

The positive electrode 11 is disposed, e.g., formed, on a first collector (not shown) and uses oxygen as an active material. The negative electrode 12 is disposed, e.g., formed, on a second collector (not shown) and may reversibly store and discharge lithium. The first and second collectors may comprise a net-shaped or mesh porous material in order to diffuse oxygen at a suitable rate. The first and second collectors may comprise a porous metal plate, and may comprise a suitable metal, such as at least one selected from stainless steel, nickel (Ni), and aluminum (Al). However, the present disclosure is not limited thereto, and any material that may suitably form a collector may be used. The collector may optionally be coated with an oxidation resistant metal or an alloy film to reduce or effectively prevent oxidation.

The positive electrode 11, which uses oxygen as a positive electrode active material, may comprise a conductive material. The conductive material may be porous. Any suitable porous and conductive material may be used as the positive electrode active material. For example, the positive electrode active material may comprise a porous carbon-based material. Examples of the carbon-based material may include at least one selected from a carbon black-based material, a graphite-based material, a graphene-based material, an activated carbon-based material, a carbon fiber-based material, and the like. Also, the positive electrode active material may comprise a metallic conductive material such as at least one selected from a metal fiber, a metal mesh, and the like. In addition, the positive electrode active material may comprise a metallic powder such as a metallic powder comprising at least one selected from copper (Co), silver (Ag), Ni, Al, and the like. Alternatively or in addition, the positive electrode active material may comprise an organic conductive material, such as a polyphenylene derivative, such as at least one selected from poly(para-phenylene vinylene) (PPV), polyacetylene (PA), polythiophene (PT), poly3alkyl-thiophene) (P3AT), polypyrrole (Ppy), poly-isothianaphthene (PITN), poly (ethylene dioxythiophene (PEDOT), and an alkoxy-substituted poly(para-phenylene vinylene) (PPV). A combination comprising at least one of the foregoing conductive materials may be used, and thus the conductive materials may be used individually or in combination.

The positive electrode 11 may include a catalyst for oxidation/reduction of oxygen. Examples of the catalyst may include at least one selected from a noble metal-based catalyst such as at least one selected from platinum (Pt), gold (Au), silver (Ag), palladium (Pd), ruthenium (Ru), rhodium (Rh), and osmium (Os), an oxide-based catalyst such as at least one selected from manganese oxide, iron oxide, cobalt oxide, and nickel oxide, and an organic metal-based catalyst such as cobalt phthalocyanine. However, the catalyst is not limited thereto, and the positive electrode 11 may include any suitable catalyst that may be used as an oxygen oxidation/reduction catalyst.

Also, the catalyst may be supported on a carrier. The carrier may comprise at least one selected from an oxide, a zeolite, a clay-based mineral, carbon, and the like. The oxide may include at least one selected from alumina, silica, oxide zirconium, titanium dioxide, and the like. The oxide may include at least one metal selected from Ce, Pr, Sm, Eu, Tb, Tm, Yb, Sb, Bi, V, Cr, Mn, Fe, Co, Ni, Cu, Nb, Mo, and W. The carbon may comprise at least one selected from a carbon black-based material, a graphite-based material such as natural graphite, artificial graphite, expanded graphite, an activated carbon-based material, a carbon fiber, and the like. However, the carrier is not limited thereto, and any suitable material that may be used as a carrier may be used.

The positive electrode 11 may further include a binder. The binder may include at least one selected from a thermoplastic resin and a thermosetting resin. Examples of the binder may include at least one selected from polyethylene, polypropylene, polytetrafluoroethylene ("PTFE"), polyvinylidene fluoride ("PVDF"), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer, and the like. The foregoing binders may be used individually or in combination. However, the binder is not limited thereto, and any suitable material that may be used as a binder may be used.

The positive electrode 11 may be manufactured by mixing, for example, the oxidation/reduction oxygen catalyst, the conductive material, and the binder to form a mixture, adding a proper solvent to the mixture to manufacture a positive electrode slurry, disposing, e.g., coating, the positive electrode slurry on a surface of a collector, drying the positive electrode slurry, and optionally compression-molding the collector to manufacture the positive electrode. Also, the positive electrode 11 may optionally include lithium oxide. Alternatively, the oxidation/reduction oxygen catalyst may optionally be omitted.

The negative electrode 12, which is capable of reversibly discharging lithium ions, may comprise at least one selected from lithium (Li) metal, a lithium composite, a lithium intermetallic compound, and a lithium metal-based alloy, but the present disclosure is not limited thereto. The capacity of the negative electrode 12 may determine a capacity of a lithium air battery. The lithium metal-based alloy, the lithium composite, and the lithium intermetallic compound each independently may include, for example, Al, tin (Sn), magnesium (Mg), indium (In), calcium (Ca), germanium (Ge), antimony (Sb), bismuth (Bi), and lead (Pb), in addition to Li.

The first electrolyte 13 may comprise at least one selected from an aqueous liquid electrolyte, a non-aqueous liquid electrolyte, and a lithium ion conductive polymer. In an embodiment, the first electrolyte 13 may comprise an aqueous liquid electrolyte and a non-aqueous liquid electrolyte, and may be formed by mixing an aqueous liquid electrolyte and a non-aqueous liquid electrolyte. When the first electrolyte 13 comprises an aqueous liquid electrolyte, a reaction mechanism may be as shown in Equation 1.

$$4Li + O_2 + 2H_2O \rightarrow 4LiOH \quad E° = 3.45V \tag{1}$$

When the first electrolyte 13 is a non-aqueous liquid electrolyte, a reaction mechanism may be as shown in Equation 2A and/or 2B.

$$4Li + O_2 \leftrightarrow 2Li_2O \quad E° = 2.91V \tag{2A}$$

$$2Li + O_2 \leftrightarrow Li_2O_2 \quad E° = 3.10V \tag{2B}$$

The aqueous liquid electrolyte comprises water and a salt of an alkali metal and/or an alkali earth metal. The salt may be a lithium salt, e.g., at least one selected from LiOH, LiBr, LiCl, or Li The non-aqueous liquid electrolyte may include an aprotic solvent. The aprotic solvent may be, for example, at least one selected from a carbonate-based solvent, an ester-based solvent, an ether-based solvent, a ketone-based solvent, an amine-based solvent, and a phosphine-based solvent. Examples of suitable carbonate solvents include at least one selected from ethylene carbonate, propylene carbonate, dimethyl carbonate, diethyl carbonate, and ethyl methyl carbonate. Non-limiting examples of suitable ester-based solvents include at least one selected from n-methyl acetate, n-ethyl acetate, n-propyl acetate, dimethyl acetate, methyl propionate, ethyl propionate, γ-butyrolactone, decanolide, valerolactone, mevalonolactone and caprolactone. The ether may be at least one selected from a cyclic ether and an acyclic ether. Non-limiting examples of suitable ether-based solvents include at least one selected from dibutyl ether, tetraethylene glycol dimethyl ether (tetraglyme), diglyme, dimethoxyethane, 2-methyltetrahydrofuran and tetrahydrofuran. Non-limiting examples of suitable ketone-based solvents include cyclohexanone and polymethyl vinyl ketone. Examples of the amine-based solvent include at least one selected from triethylamine and triphenylamine. An example of the phosphine-based solvent includes triethylphosphine. Tetraglyme is specifically mentioned.

Also, the aprotic solvent may be a nitrile-based solvent such as at least one selected from a compound of the formula R—CN (wherein R is a linear, branched, or cyclic hydrocarbon group with about 2 to about 20 carbon atoms and may include a double bonded aromatic ring or an ether linkage), an amide-based solvent such as dimethyl formamide, a dioxolane-based solvent such as 1,3-dioxolane, a sulfolane-based solvent, and the like.

In an embodiment, the aprotic solvent includes a single solvent, and in another embodiment a mixture of two or more solvents may be used.

Also, the non-aqueous liquid electrolyte may include an ionic liquid. The ionic liquid may be a compound including a positive ion and a negative ion. The positive ion may be linear or branched and substituted or unsubstituted, and may comprise at least one selected from an ammonium, imidazolium, pyrrolidinium, and a piperidinium ionic liquid. The ionic liquids my include at least one selected from 1-ethyl-3-methyl-imidazolium bis(fluorosulfonyl)imide (EMIM$^+$/FSI$^-$), 1-ethyl-3-methyl-imidazolium bis(trifluoromethylsulfonyl)imide (EMIM$^+$/TFSI$^-$), N-methyl-N-butyl-pyrrolidinium bis (fluorosulfonyl)imide (Py$_{14}^+$/FSI$^-$), and N-methyl-N-propyl-piperidinium bis(fluorosulfonyl)imide (PP$_{13}^+$/FSI$^-$). A negative ion of the ionic liquid may comprise at least one selected from PF$_6^-$, BF$_4^-$, CF$_3$SO$_3^-$, (CF$_3$SO$_2$)$_2$N$^-$, (C$_2$F$_6$SO$_2$)$_2$N$^-$, and (CN)$_2$N$^-$.

The non-aqueous liquid electrolyte may include a salt of an alkali metal and/or an alkali earth metal. The salt of the alkali metal and/or the alkali earth metal may be dissolved in an organic solvent. The salt may serve as a source of the alkali metal and/or the alkali earth metal in a battery. The salt of the alkali metal and/or the alkali earth metal may support movement of, for example, an alkali metal ion and/or an alkali earth metal ion between the positive electrode 11 and the negative electrode 12.

Negative ions of the salt included in the non-aqueous liquid electrolyte may include at least one selected from PF$_6^-$, BF$_4^-$, SbF$_6^-$, AsF$_6^-$, C$_4$F$_9$SO$_3^-$, ClO$_4^-$, AlO$_2^-$, AlCl$_4^-$, C$_x$F$_{2x+1}$SO$_3^-$ (wherein x is a natural number, e.g., 1 to about 12), (C$_x$F$_{2x+1}$SO$_2$) (C$_y$F$_{2y+1}$SO$_2$)N$^-$ (wherein x and y are natural numbers, e.g., each independently 1 to about 12), and a halide.

The lithium ion conductive polymer may comprise a polymer, such as at least one selected from polyethylene oxide, polyacrylonitrile, polyester, polyethylene glycol, polypropylene oxide, polymethylmethacrylate, polydimethylsiloxane, polyvinylpyrrolidone, polyacrylonitrile and the like, and a lithium salt, wherein lithium salt may include one or more selected from LiPF$_6$, LiBF$_4$, LiSbF$_6$, LiAsF$_6$, LiN(SO$_2$C$_2$F$_5$)$_2$, Li(CF$_3$SO$_2$)$_2$N, LiC$_4$F$_9$SO$_3$, LiClO$_4$, LiAlO$_2$, LiAlCl$_4$, LiN(C$_x$F$_{2x+1}$SO$_2$)(C$_y$F$_{2y+1}$SO$_2$) (wherein x and y are each a natural number, e.g., 1 to about 12), LiF, LiBr, LiCl, LiI, and LiB(C$_2$O$_4$)$_2$ (lithium bis(oxalato) borate; LiBOB). Also, the lithium ion conductive polymer may comprise at least one selected from polyethylene, polypropylene, polytetrafluoroethylene ("PTFE"), polyvinylidene fluoride ("PVDF"), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer, and the like.

Figure 2:
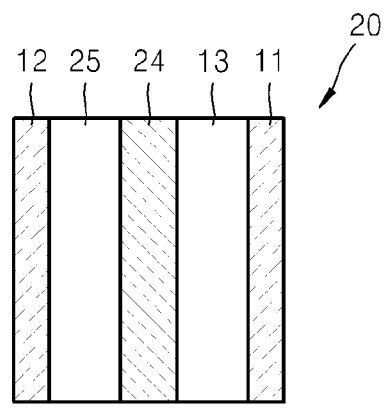
FIG. 2 is a schematic diagram of another embodiment of a lithium air battery cell.

FIG. 2 is a view of a lithium air battery cell 20 according to another embodiment.

Referring to FIG. 2, the lithium air battery cell 20 includes a positive electrode 11, a negative electrode 12 disposed non-adjacent, i.e., spaced apart from, the positive electrode 11, a first electrolyte 13 interposed between the positive electrode 11 and the negative electrode 12, a passivation layer 24 interposed between the first electrolyte 13 and the negative electrode 12, and a second electrolyte 25 interposed between the passivation layer 24 and the negative electrode 12. In FIG. 2, the negative electrode 12, the second electrolyte 25, and the passivation layer 24 may referred to as a protected negative electrode. The positive electrode 11, the negative electrode 12, and the first electrolyte 13 shown in FIG. 2 correspond to the positive electrode 11, the negative electrode 12, and the first electrolyte 13 of FIG. 1, and thus further detailed description thereof is not repeated.

The second electrolyte 25 may be as provided above for the first electrolyte 13, the disclosure of which is not repeated for clarity. In an embodiment, the second electrolyte 25 comprises a non-aqueous liquid electrolyte, which is further disclosed above.

The passivation layer 24 may comprise at least one selected from an inorganic solid electrolyte, a polymer solid electrolyte, a gel-type polymer electrolyte, and a lithium ion conductive solid electrolyte.

The inorganic solid electrolyte layer may comprise, for example, at least one selected from $Cu_3N$, $Li_3N$, and LiPON.

The polymer solid electrolyte layer may comprise a polyethylene oxide layer, or the like.

The polymer solid electrolyte layer may be manufactured by mixing, for example, a lithium salt and a lithium ion conductive polymer.

The lithium salt may include one or more selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are each a natural number, e.g., 1 to about 12), LiF, LiBr, LiCl, LiI, and $LiB(C_2O_4)_2$ (lithium bis(oxalato) borate; LiBOB).

The lithium ion conductive polymer of the polymer solid electrolyte layer may comprise at least one selected from polyethylene oxide, polyacrylonitrile, polyester, polyethylene glycol, polypropylene oxide, polymethylmethacrylate, polydimethylsiloxane, polyvinylpyrrolidone, polyacrylonitrile and the like.

The gel-type polymer electrolyte may comprise at least one selected from an aqueous liquid electrolyte and a non-aqueous liquid electrolyte, each of which is further disclosed above, and a polymer. The polymer of the gel-type polymer electrolyte may comprise include at least one selected from polyethylene, polypropylene, polytetrafluoroethylene ("PTFE"), polyvinylidene fluoride ("PVDF"), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer, and the like.

The lithium ion conductive solid electrolyte layer may include at least one selected from an inorganic material and a polymer solid electrolyte component.

The lithium ion conductive solid electrolyte layer may comprise a glass-ceramic solid electrolyte or a stack including a glass-ceramic solid electrolyte and a polymer solid electrolyte disposed thereon. Hereinafter, the lithium ion conductive solid electrolyte layer will be described in further detail.

The lithium ion conductive solid electrolyte layer may comprise a lithium ion conductive phase which comprises at least one selected from a lithium ion conductive glass, a lithium ion conductive ceramic, a lithium ion conductive glass-ceramic), and an inorganic material including a combination of the lithium ion conductive glass and the lithium ion conductive ceramic. While not wanting to be bound by theory, it is understood that if the lithium ion conductive solid electrolyte layer comprises an oxide, improved chemical stability may result.

When the lithium ion conductive solid electrolyte layer includes a relatively large amount of the lithium ion conductive phase, a relatively high conductivity may be obtained. For example, the lithium ion conductive solid electrolyte layer may include an amount of the lithium ion conductive phase equal to or greater than 50 weight percent (wt %), specifically greater than 55 wt %, or about 50 to about 99 wt %, based on a total weight of the solid electrolyte layer.

The lithium ion conductive phase may be crystalline phase having a perovskite structure and having lithium ionic conductivity, and may be at least one selected from $Li_3N$, a LISICON-based material, $La_{0.55}Li_{0.35}TiO_3$, $LiTi_2P_3O_{12}$ having an NASICON-type structure, and a glass-ceramic.

The lithium ion conductive phase may comprise, for example, at least one selected from $Li_{1+x+y}(Al, Ga)_x(Ti, Ge)_{2-x}Si_yP_{3-y}O_{12}$, wherein x and y satisfy the inequalities $0 \le x \le 1$ and $0 \le y \le 1$, for example, $0 \le x \le 0.4$ and $0 \le y \le 0.6$, or $0.1 \le x \le 0.3$ and $0.1 \le y \le 4$. While not wanting to be bound by theory, it is understood that the grain boundary can interrupt ion conduction. Accordingly, in order to attain high ion conductance, the lithium-ion conductive phase may not include a grain boundary, or may have a reduced grain boundary concentration. For example, since a glass-ceramic may be substantially non-porous and may effectively not have a grain boundary, which interrupts ion conduction, high ion conductance and excellent chemical stability may be provided by the glass-ceramic.

For example, the lithium ion conductive phase may comprise at least one selected from lithium-aluminum-germanium-phosphate ("LAGP"), lithium-aluminum-titanium-phosphate ("LATP"), lithium-aluminum-titanium-silicon-phosphate ("LATSP"), and the like, as a glass-ceramic.

For example, when a mother glass has a $Li_2O$—$Al_2O_3$—$TiO_2$—$SiO_2$—$P_2O_5$-based composition and the mother glass is crystallized through annealing, a primary crystal phase may be $Li_{1+x+y}Al_xTi_{2-x}Si_yP_{3-y}O_{12}$, wherein $0 \le x \le 1$ and $0 \le y \le 1$, specifically $0 \le x \le 0.4$ and $0 \le y \le 6$, and more specifically, $0.1 \le x \le 0.3$ and $0.1 \le y \le 0.4$.

In this regard, a pore or a grain boundary that interrupts ionic conduction may refer to any structure which interrupts ionic conductivity. The pore or a grain boundary may decrease the conductivity of an inorganic material including the lithium ion conductive phase to a value equal to or less than 1/10th of the conductivity of the lithium ion conductive phase without the pore or grain boundary.

Also, the glass-ceramic may refer to a material obtained by extracting a crystalline phase from a glass phase by annealing the glass, wherein the material includes an amorphous solid and a crystalline phase. In addition, the glass-ceramic may be a material in which all glass phases are phase-transited into a crystalline phase, for example, to provide a material in which a crystalline amount (i.e., a degree of crystallization) is about 90% to about 100%, specifically about 100 wt %, based on a total weight of the material. In the case of the glass-ceramic, in an embodiment wherein the material is fully crystallized (e.g., the degree of crystallization is about 100%), a pore may not be present between crystals or in the crystals.

In an embodiment wherein the lithium ion conductive solid electrolyte layer includes a significant amount of the glass-ceramic, the lithium ion conductive solid electrolyte layer may have a relatively high ionic conductivity. Thus, an amount of a lithium ion conductive glass ceramic in the lithium ion conductive solid electrolyte may be equal to or more than about 80 wt %, or equal to or greater than about 90 wt %, specifically about 80 to about 99.9 wt %, to provide improved ionic conductivity.

The lithium ion conductive solid electrolyte layer may further include a polymer solid electrolyte in addition to the glass-ceramic. The polymer solid electrolyte may comprise at least one selected from polyethylene oxide, polyacrylonitrile, polyester, polyethylene glycol, polypropylene oxide, polymethylmethacrylate, polydimethylsiloxane, polyvinylpyrrolidone, polyacrylonitrile and the like, and may be doped with a lithium salt. In an embodiment, the polymer solid electrolyte may comprise a poly(ethylene oxide) comprising, e.g., doped with, a lithium salt. Examples of the lithium salt may include at least one selected from $LiN(SO_2CF_2CF_3)_2$, $LiBF_4$, $LiPF_6$, LiSbF$_6$, LiAsF$_6$, LiClO$_4$, LiCF$_3$SO$_3$, LiN(SO$_2$CF$_3$)$_2$, LiN(SO$_2$C$_2$F$_5$)$_2$, LiC(SO$_2$CF$_3$)$_3$, LiN(SO$_3$CF$_3$)$_2$, LiC$_4$F$_9$SO$_3$, LiAlCl$_4$, and the like.

The polymer solid electrolyte layer and the glass-ceramic together may form a layered, e.g., stacked, structure, and the glass-ceramic may be interposed between a first polymer solid electrolyte and a second polymer solid electrolyte, each of which may independently include the above-described components.

The lithium ion conductive solid electrolyte layer may be used as a single layer or a multi layer.

While not wanting to be bound by theory, an embodiment of the operating principles of the lithium air battery cells 10 and 20 are understood to be as follows. During discharging of the lithium air battery cells 10 and 20, a lithium ion derived from the negative electrode 12 contacts oxygen provided by the positive electrode 11, and lithium oxide is generated and oxygen is reduced. Thus on discharge an oxygen reduction reaction ("ORR") occurs at the positive electrode. On the contrary, during charge of the lithium air battery cells 10 and 20, lithium oxide is reduced and oxygen is oxidized in an oxygen evolution reaction ("OER") to generate oxygen at the positive electrode.

However, and while not wanting to be bound by theory, it is understood that in the lithium air battery cells 10 and 20, various problems may occur due to evaporation of an electrolyte at the positive electrode 11. For example, an area of an interface between the positive electrode 11 and the electrolyte may be reduced, and thus a battery capacity can be decreased or a lifespan of a battery may be reduced due to a decrease in an amount of the electrolyte. In this regard, the decreased amount of electrolyte is understood to be because a solvent of the electrolyte evaporates. In order to substantially or effectively prevent the evaporation of the electrolyte, the first electrolyte 13 may include a lithium ion conductive polymer, a lithium salt, and a compound represented by the following Formula (1),

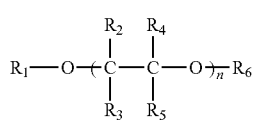
(1)

wherein R$_1$ and R$_6$ are each independently selected from a hydrogen atom, a nitro group, an amino group, a halogen atom, a cyano group, a carboxyl group, a substituted or unsubstituted C1-C20 alkyl group, a substituted or unsubstituted C6-C30 aryl group, a substituted or unsubstituted C3-C20 heteroaryl group, and a substituted or unsubstituted C3-C20 carbocyclic group, R$_2$ to R$_5$ are each independently selected from a hydrogen atom, a nitro group, an amino group, a hydroxyl group, a halogen atom, a cyano group, a carboxyl group, a substituted or unsubstituted C1-C20 alkyl group, a substituted or unsubstituted C2-C20 alkenyl group, a substituted or unsubstituted C2-C20 alkynyl group, a substituted or unsubstituted C1-C20 alkoxy group, a substituted or unsubstituted C2-C20 alkoxycarbonyl group, a substituted or unsubstituted C6-C30 aryl group, a substituted or unsubstituted C3-C20 carbocyclic group, a substituted or unsubstituted C3-C20 heteroaryl group, a substituted or unsubstituted C2-C20 alkylcarbonyl group, a substituted or unsubstituted C7-C30 arylcarbonyl group, and a substituted or unsubstituted C4-C30 heteroarylcarbonyl group, and n is 1 to about 20.

Figure 3:
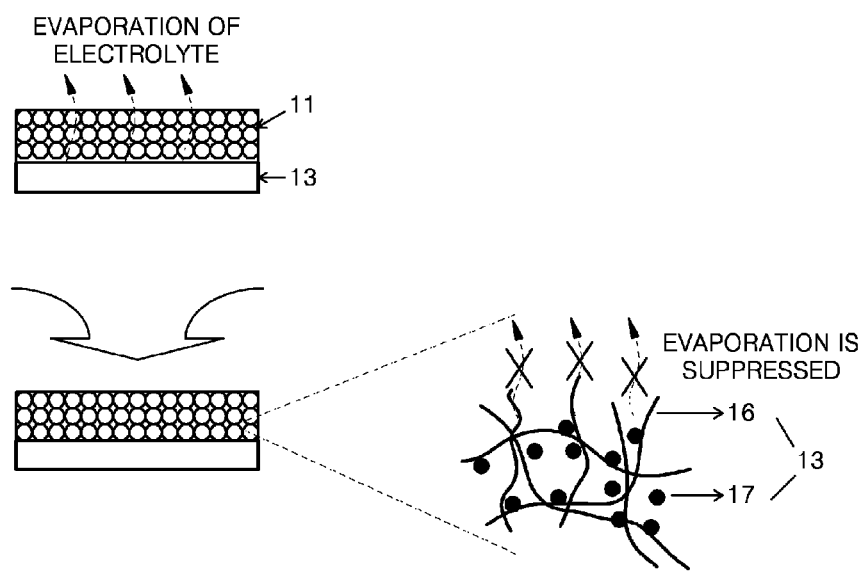
FIG. 3 is a scheme describing an embodiment of an operating principle of a lithium air battery cell.

Hereinafter, and while not wanting to be bound by theory, an embodiment of the operating principles of the lithium air battery cells 10 and 20 will be further described with reference to the operating scheme illustrated in FIG. 3, which shows a porous positive electrode 11 and a first electrolyte 13.

In an embodiment, the first electrolyte 13 comprises a lithium ion conductive polymer 16 and a compound 17 of Formula (1). The lithium ion conductive polymer 16 is understood to substantially or effectively prevent a compound 17 of Formula (1) from evaporating from the first electrolyte 13. For example, the lithium ion conductive polymer 16, as shown in FIG. 1, includes the compound 17 of Formula (1) in a polymer matrix, and effectively prevents evaporation of the electrolyte, providing improved electrolyte stability. The lithium ion conductive polymer of the lithium ion conductive polymer 16 may be the same as the polymer of the polymer solid electrolyte layer disclosed above. As is further disclosed above, the lithium ion conductive polymer may comprise at least one selected from polyethylene oxide, polyacrylonitrile, polyester, polyethylene glycol, polypropylene oxide, polymethyl methacrylate, polydimethylsiloxane, polyvinylpyrrolidone, polyacrylonitrile, and the like, for example.

According to an embodiment, the first electrolyte 13 includes polyethylene oxide, which is a lithium ion conductive polymer, tetraglyme (i.e., CH$_3$O—(CH$_2$CH$_2$O)$_4$—CH$_3$), which is a compound of Formula (1), and lithium bis(trifluoromethanesulfonyl)imide ("LiTFSI"), which is lithium salt.

While not wanting to be bound by theory, it is understood that because the polyethylene oxide and the tetraglyme have similar structural units, the polyethylene oxide and the tetraglyme strongly interact with each other when combined, and provide an unexpected reduction in evaporation of the tetraglyme.

A hydrophilic matrix polymer having lithium-ion conductivity may be used as the lithium ion conductive polymer. The hydrophilic matrix polymer may be at least one selected from an alkylene oxide-based polymer, a hydrophilic acryl-based polymer, and a hydrophilic methacryl-based polymer.

The alkylene oxide-based polymer has an alkyleneoxide chain, which is a chain in which an alkylene group and an ether oxygen are alternately arranged. The alkyleneoxide chain may have a branch. The alkylene oxide-based polymer may be at least one selected from polypropylene oxide, polyethylene oxide, and a polyethylene oxide/polypropylene oxide copolymer.

The hydrophilic acryl-based polymer and the hydrophilic methacryl-based polymer refer to an acryl-based polymer and a methacryl-based polymer that each have a hydrophilic group, respectively. The hydrophilic group may be any functional group that provides hydrophilic properties, for example, at least one selected from a phosphate group, a sulfonic acid group, and the like.

In an embodiment, in Formula (1), R$_1$ and R$_6$ are each independently selected from a hydrogen atom and a C1-C10 alkyl group, R$_2$ to R$_5$ are each a hydrogen atom or a C1-C10 alkyl group, and n is 1 to about 8. The compound of Formula (1) may be, for example, tetraglyme, i.e., CH$_3$O—(CH$_2$CH$_2$O)$_4$—CH$_3$.

The content of the lithium salt in the first electrolyte may be about 0.1 to about 70 parts by weight, specifically about 0.5 to about 60 parts by weight, more specifically about 1 to about 50 parts by weight, based on 100 parts by weight of the lithium ion conductive polymer.

When the compound of Formula (1) and the lithium salt content are in the above-described range, the electrolyte has an appropriate conductivity and viscosity, and thus the electrolyte may have excellent properties, and including suitable lithium ion conductivity.

In addition, an additional electrolyte is additionally disposed non-adjacent, i.e., separated from the first electrolyte.

Figure 4:
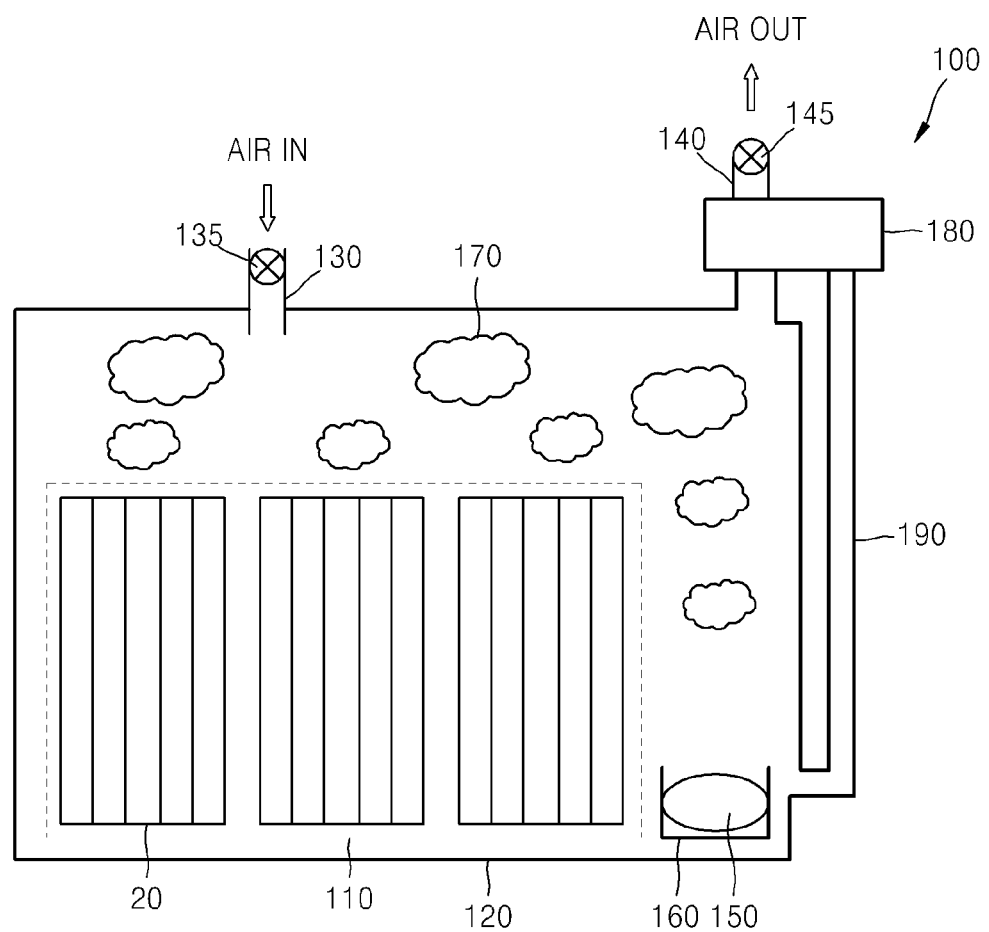
FIG. 4 is a schematic diagram of an embodiment of a lithium air battery module including an embodiment of a lithium air battery cell.

FIG. 4 is a schematic diagram of an embodiment of a lithium air battery module 100 including an embodiment of a lithium air battery cell.

Referring to FIG. 4, the lithium air battery module 100 includes a battery unit 110 including at least one lithium air battery cell and a housing 120 for providing a space in which the battery unit 110 is accommodated.

The battery unit 110 may include the lithium air battery cell 10 or 20 as shown in FIG. 1 or 2. When there are a plurality of lithium air battery cells, the lithium air battery cells 10 may be connected to one another in series, parallel, or a combination thereof.

The housing 120 selectively limits air from contacting, e.g., reacting with, the lithium air battery cell 10 of the battery unit 110 by controlling fluid communication between the battery unit 110 and air outside the housing 120. The housing 120 may electrically separate the negative electrode 12 and the positive electrode 11 in the battery unit 110 and may be formed of an insulating material, e.g., a resin. Also, the housing 120 may include a path through which air communicates with, e.g., flows to and/or from, the outside. For example, the housing 120 may include an inlet 130 into which air is injected and an outlet 140 from which air is discharged to the outside. The inlet 130 and the outlet 140 may be disposed in an upper part of the housing 120.

Also, the housing 120 may further include an additional electrolyte 150. In an embodiment, the additional electrolyte 150 may comprise at least one selected from the aqueous liquid electrolyte, the non-aqueous liquid electrolyte, the lithium ion conductive polymer, the compound represented by Formula (1), and a salt, further description of which is provided above, and thus additional detailed description is not repeated here for clarity. In an embodiment, the additional electrolyte is the same as the first electrolyte 13, which is adjacent to the positive electrode 11. In another embodiment, the additional electrolyte 150 comprises at least one selected from the aqueous liquid electrolyte and the non-aqueous liquid electrolyte. In yet another embodiment, the additional electrolyte is the same as the first electrolyte with the exception that the additional electrolyte does not include a salt.

Since the positive electrode 11 is comprises a porous material, the first electrolyte 13 (or a component thereof), which is adjacent to the positive electrode 11, may evaporate into the air. While not wanting to be bound by theory, it is understood that if an evaporated electrolyte 170 is discharged to the outside, a capacity of the first electrolyte 13 inside the lithium air battery cell 10 is decreased, thereby reducing a lifespan of the lithium air battery cell 10. Accordingly, the additional electrolyte 150 may further be disposed in the housing 120 so as to maintain a saturated state of the evaporated electrolyte 170. The additional electrolyte 150 may be disposed non-adjacent, i.e., spaced apart from, the first electrolyte 13, and may be disposed outside of the battery unit 110. The lithium air battery module 100 may further include an accommodating unit 160 for accommodating the additional electrolyte 150. The accommodating unit 160 may be disposed in a lower part of the housing 120. The accommodating unit 160 may be any suitable container having any suitable shape.

The additional electrolyte 150 may be generated by condensing the evaporated electrolyte 170. For example, the lithium air battery module 100 may further include a collector 180 for collecting the evaporated electrolyte 170 and a flow path 190, which may be in fluid communication with a lower portion of the housing 120 connect and provide a flow path between the collector 180 and the accommodating unit 160. The collector 180 may be a cooling unit for condensing the evaporated electrolyte 170 in the discharged air. The condensed electrolyte may enter the accommodating unit 160 via the flow path 190. Accordingly, the evaporated electrolyte 170 may be used as the additional electrolyte 150. In an embodiment, the condensed electrolyte may be a volatile component of the first electrolyte and/or the additional electrolyte.

In an embodiment, the additional electrolyte 150 may also enter the accommodating unit 160 via another path. For example, the lithium air battery module 100 may include an additional path into which the additional electrolyte 150 is injected, so that the additional electrolyte 150 may be injected into the lithium air battery module 100 at a predetermined time interval or whenever the lithium air battery cell 10 is charged.

Also, the lithium air battery module 100 may further include an inlet valve 135 and an outlet valve 145 for selectively opening and closing the inlet 130 and the outlet 140 so that air may be injected when the lithium air battery cell 10 is charged and so that air may be discharged when the lithium air battery cell 10 is discharged.

Hereinafter, the present disclosure will be described in more detail by explaining exemplary embodiments of the invention, but the present disclosure is not limited thereto.

Manufacturing Example 1

A first electrolyte is prepared by mixing 7 grams (g) of lithium bis(trifluoromethanesulfonyl)imide ("LiTFSI"), 20 mL of tetraglyme, and 4 g of polyethylene oxide (PEO, weight-average molecular weight of about 600,000, and manufactured by Aldrich Chemical Co.).

Comparative Example 1

A first electrolyte is prepared by manufacturing a 1 molar (M) solution of LiTFSI in tetraglyme by mixing 7 g of LiTFSI and 20 mL of tetraglyme.

Evaluation Example 1

Evaluation of Evaporation Speed of Electrolyte

An evaporation rate of an electrolyte is evaluated by observing a variation in weight according to time in the first electrolytes manufactured in Manufacturing Example 1 and Comparative Example 1.

Figure 5:
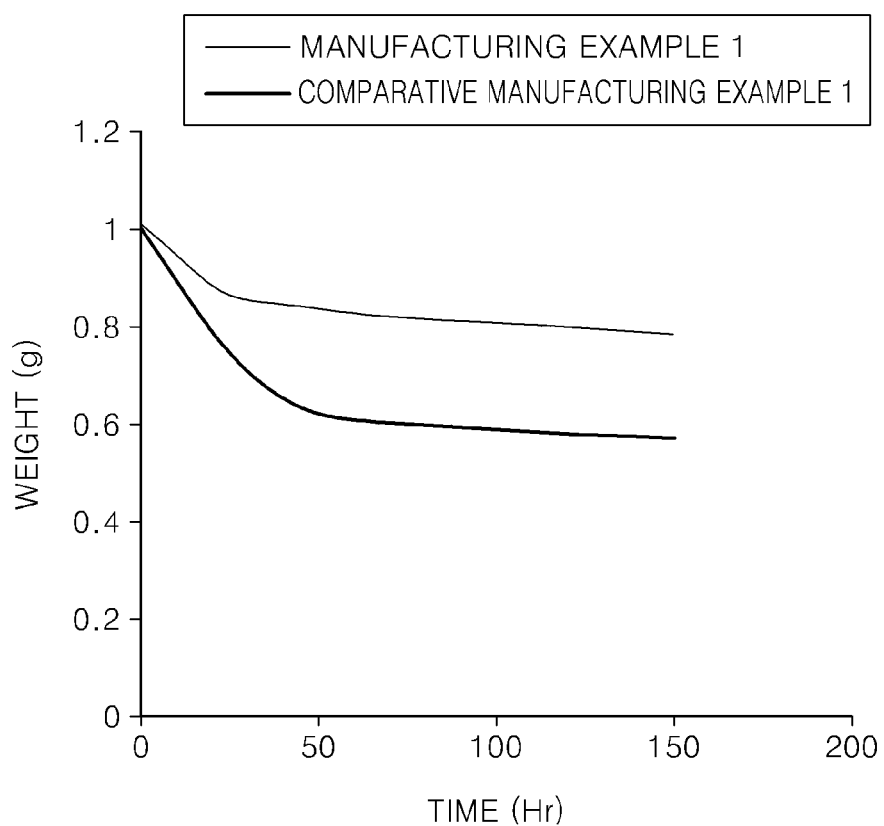
FIG. 5 is a graph of weight (grams, g) versus time (hours, hr) showing a variation in weight according to time of the electrolytes manufactured in Manufacturing Example 1 and Comparative Manufacturing Example 1.

A result of the evaluation is shown in a graph of FIG. 5. Referring to FIG. 5, comparing the first electrolyte of Manufacturing Example 1 and the first electrolyte of Comparative Manufacturing Example 1, it is seen that the evaporation rate is suppressed in the first electrolyte of Manufacturing Example 1.

Performance of Lithium Air Battery Module

Hereinafter, a performance of a lithium air battery module according to whether an additional electrolyte is present will be further described.

Example 2

The first electrolyte is prepared by manufacturing a 1 M LiTFSI tetraglyme solution. A lithium air battery module was manufactured that included the additional electrolyte, and the additional electrolyte was 1M LiTFSI in tetraglyme.

Comparative Example 2

The lithium air battery module according to Comparative Example 2 was the same as that of Example 2, except that the lithium air battery module of Comparative Example 2 does not include the additional electrolyte.
Evaluation of the Lithium Air Battery Modules of Example 2 and Comparative Example 2

The lithium air battery modules 100 of Example 2 and Comparative Example 2 are discharged at a constant current of 0.2 milliamperes per square centimeter (mA/cm$^2$) for one hour and then discharged to a voltage of 1.7 V (vs. Li). Then, the lithium air battery modules 100 are charged up to a voltage of 4.2 V at a constant current of 1 mA/cm$^2$ and then are charged at up to a current of 0.2 mA/cm$^2$ at a constant voltage of 4.2 V. This process is repeatedly performed.

Figure 6:
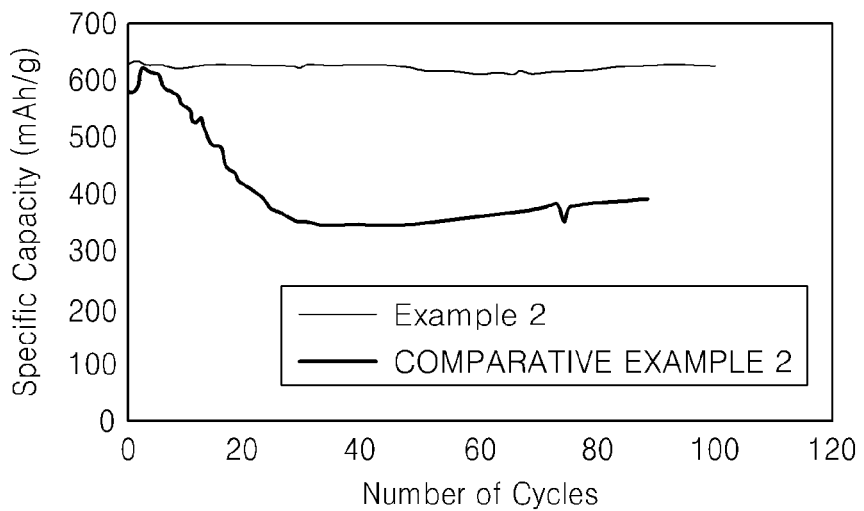
FIG. 6 is a graph of specific capacity (milliampere hours per gram, mAh/g) versus number of cycles for Example 2, which included the additional electrolyte, and Comparative Example 2, which did not include the additional electrolyte, showing a result obtained by measuring retention according to whether an additional electrolyte is present.

FIG. 6 is a graph of specific capacity versus number cycles showing an experimental result obtained by measuring capacity according to whether an additional electrolyte is present.

As shown in FIG. 6, in Comparative Example 2 in which an additional electrolyte is not present, if a frequency of charging/discharging is increased, the capacity decreases. However, in Example 2, the capacity is maintained irrespective of a frequency of charging/discharging.

Comparative Example 3

An experiment was performed which determined the voltage of a lithium air battery module over five cycles, wherein the lithium air battery module did not include the additional electrolyte.

Figure 7A:
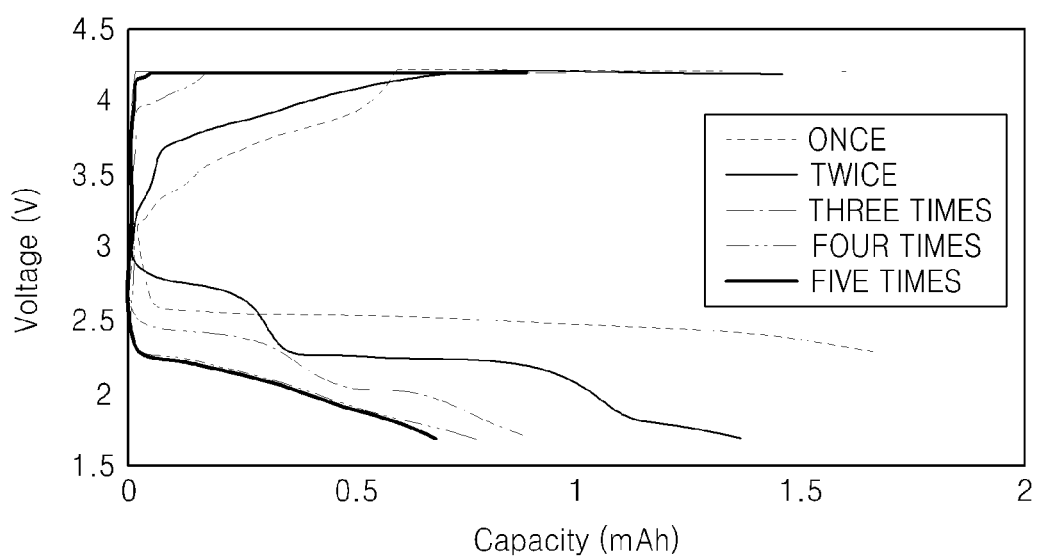
FIG. 7A is a graph of voltage (volts, V) versus capacity (milliampere hours, mAh) showing the results of the lithium air battery of Comparative Example 3, which did not include an additional electrolyte, obtained by charging and discharging the battery five times.

FIG. 7A is a graph showing an experimental result of Comparative Example 3, which was obtained by measuring a voltage when the additional electrolyte is not present.

Example 3

An experiment was performed which determined the voltage of a lithium air battery module over five cycles, wherein the lithium air battery module included the additional electrolyte.

Figure 7B:
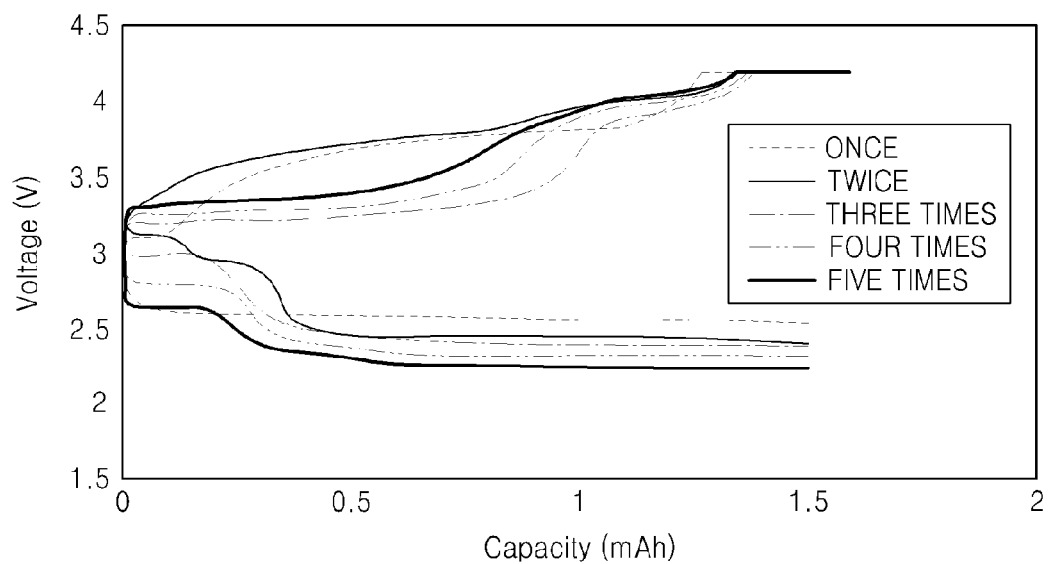
FIG. 7B is a graph of voltage (volts, V) versus capacity (milliampere hours, mAh) showing the results of Example 3, which included an additional electrolyte, obtained by charging and discharging the battery five times.

FIG. 7B is a graph showing an experimental result of Example 3 obtained by measuring a voltage when an additional electrolyte is present.

As shown in FIG. 7A, in Comparative Example 3 in which an additional electrolyte is not included, as a frequency of charging/discharging is increased, a voltage is decreased. However, as shown in FIG. 7B, in Example 3 in which an additional electrolyte is included, the voltage is maintained at equal to or greater than 2 V, the capacity of the lithium air battery module is improved, and the average voltage is improved.

Figure 8:
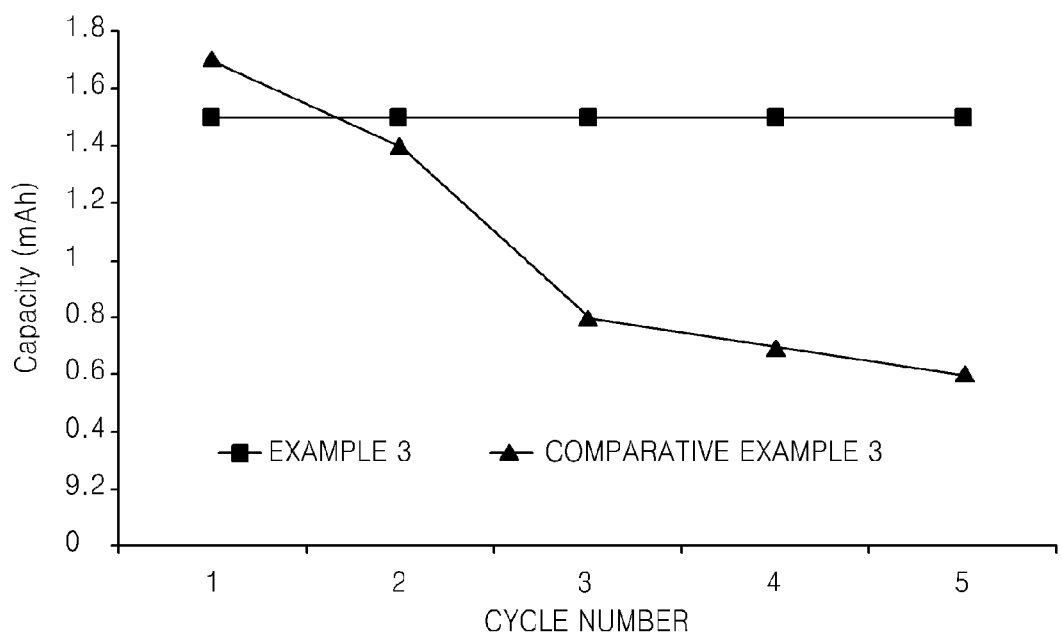
FIG. 8 is a graph of capacity (milliampere-hours (mAh)) versus cycle number for the lithium air batteries of Comparative Example 3 and Example 3.

The results from the charging and discharging of the lithium air batteries of Comparative Example 3 and Example 3 are further illustrated in FIG. 8, which is a graph of capacity (milliampere-hours, mAh) versus cycle number. As shown in FIG. 8, the capacity of Example 3 was essentially constant, and the capacity of Comparative Example 3 decreased with each cycle.

According to the present disclosure, a lithium air battery module reuses an evaporated electrolyte, and thus exhaustion of the electrolyte can be reduced or effectively prevented.

It should be understood that the exemplary embodiments described herein shall be considered in a descriptive sense only and not for purposes of limitation. Descriptions of features, advantages, or aspects within each embodiment shall be considered as available for other similar features, advantages, or aspects in other embodiments.

What is claimed is:

1. A lithium air battery module comprising:
a lithium air battery cell comprising a first electrolyte;
an additional electrolyte disposed outside of and non-adjacent to the lithium air battery cell;
a housing, which accommodates the lithium air battery cell and the additional electrolyte; and
an evaporated electrolyte, which is disposed in the housing, wherein the additional electrolyte is disposed in an accommodating unit, and wherein the accommodating unit is disposed in the housing and outside of the lithium air battery cell, and
wherein the additional electrolyte maintains a saturated state of the evaporated electrolyte.

2. The lithium air battery module of claim 1, wherein the first electrolyte and the additional electrolyte each independently comprise at least one selected from an aqueous liquid electrolyte, a non-aqueous liquid electrolyte, and a lithium ion conductive polymer.

3. The lithium air battery module of claim 2, wherein the non-aqueous liquid electrolyte comprises at least one selected from a carbonate, an ester, an ether, a ketone, an amine, a phosphine, a nitrile, an amide, and a sulfolane.

4. The lithium air battery module of claim 2, wherein the lithium ion conductive polymer comprises at least one selected from polyethylene oxide, polyacrylonitrile, polyester, polyethylene glycol, polypropylene oxide, polymethyl methacrylate, polydimethylsiloxane, polyvinylpyrrolidone, and polyacrylonitrile.

5. The lithium air battery module of claim 2, wherein the additional electrolyte does not include a salt.

6. The lithium air battery module of claim 1, wherein the housing further comprises:
an outlet for discharging air inside the housing; and
a collector for collecting the additional electrolyte from the air.

7. The lithium air battery module of claim 6, wherein the collector is disposed in the outlet.

8. The lithium air battery module of claim 6, wherein the collector is effective to collect the additional electrolyte from the air.

9. The lithium air battery module of claim 6, wherein the collector collects a volatile component of at least one of the first electrolyte and the additional electrolyte.

10. The lithium air battery module of claim 1, further comprising a flow path which is disposed between a collector and the accommodating unit for moving the additional electrolyte to the accommodating unit.

11. The lithium air battery module of claim 10, wherein the collector is disposed in an upper part of the housing, and the accommodating unit is disposed in a lower part of the housing.

12. The lithium air battery module of claim 1,
wherein the lithium air battery cell comprises a positive electrode, a negative electrode, and the first electrolyte interposed between the positive electrode and the negative electrode, and
wherein the first electrolyte and the additional electrolyte are a same electrolyte.

13. The lithium air battery module of claim 12, wherein the first electrolyte is a non-aqueous liquid electrolyte.

14. The lithium air battery module of claim 12, wherein the first electrolyte further comprises at least one selected from an aprotic solvent and water.

15. The lithium air battery module of claim 12, further comprising a passivation layer interposed between a second electrolyte and the negative electrode.

16. The lithium air battery module of claim 15, wherein the passivation layer is at least one selected from an inorganic solid electrolyte, a polymer solid electrolyte, a gel polymer electrolyte, and a lithium ion conductive solid electrolyte.

17. The lithium air battery module of claim 15, further comprising a second electrolyte interposed between the negative electrode and the passivation layer.

18. The lithium air battery module of claim 17, wherein the second electrolyte comprises a non-aqueous liquid electrolyte comprising an aprotic solvent and lithium salt, an inorganic solid electrolyte, and a polymer solid electrolyte.

19. The lithium air battery module of claim 12, wherein the positive electrode comprises a porous carbon-based material.

20. The lithium air battery module of claim 1, wherein the lithium air battery cell is in only evaporative communication with the additional electrolyte.

* * * * *